United States Patent
Kannan et al.

(10) Patent No.: US 10,862,859 B2
(45) Date of Patent: Dec. 8, 2020

(54) HIGHLY AVAILABLE DHCP SERVICE BY RUNNING DHCP SERVERS ON A BLOCKCHAIN NETWORK

(71) Applicant: Hewlett Packard Enterprise Development LP, Houston, TX (US)

(72) Inventors: Balakumaran Kannan, Bangalore (IN); Manimuthu Muthaiya Athmalingam, Bangalore (IN); Dinesh Pulivalam Ramakrishnan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/217,525

(22) Filed: Dec. 12, 2018

(65) Prior Publication Data

US 2019/0334859 A1      Oct. 31, 2019

(30) Foreign Application Priority Data

Apr. 27, 2018    (IN) .............................. 201841016089

(51) Int. Cl.
*G06F 15/173*    (2006.01)
*H04L 29/12*    (2006.01)
(Continued)

(52) U.S. Cl.
CPC ...... *H04L 61/2015* (2013.01); *G06F 16/1824* (2019.01); *H04L 9/0825* (2013.01);
(Continued)

(58) Field of Classification Search
CPC ..... H04L 9/3249; H04L 41/12; H04L 45/586; H04L 61/2076; H04L 63/0478;
(Continued)

(56) References Cited

U.S. PATENT DOCUMENTS 7,254,630 B1    8/2007  Daude et al.
8,862,735 B1 *  10/2014  Singh .................. H04L 61/2076
                                                        709/226
(Continued)

FOREIGN PATENT DOCUMENTS

CN     105847464        8/2016
EP     2369815 A1       9/2011
EP     3062489 A1       8/2016

OTHER PUBLICATIONS

Vitalik Buterin, "On Public and Private Blockchains", (web page), available online at <https://blog.ethereum.org/2015/08/07/on-public-and-private-blockchains/>, Aug. 6, 2015, 3 pages.

(Continued)

*Primary Examiner* — Dustin Nguyen (57) ABSTRACT

Example embodiments in the disclosure relate to providing a highly available DHCP service using a plurality of DHCP servers running on a blockchain network. The highly available DHCP service may be provided by running a blockchain network of DHCP servers that: i) share a common pool of IP addresses that are assigned to client devices; and ii) maintain a copy of a blockchain containing a record of communications between servers and clients relating to allocation of IP addresses to clients from the common IP address pool.

17 Claims, 6 Drawing Sheets

(51) Int. Cl.
 *G06F 16/182* (2019.01)
 *H04L 9/08* (2006.01)
 *H04L 9/32* (2006.01)

(52) U.S. Cl.
 CPC ........ *H04L 9/3247* (2013.01); *H04L 61/2061* (2013.01); *H04L 2209/38* (2013.01)

(58) Field of Classification Search
 CPC ..... H04L 67/02; H04L 67/327; H04L 9/3239; G06Q 20/065; G06F 11/1458; H04W 48/20
 See application file for complete search history.

(56) References Cited

U.S. PATENT DOCUMENTS

| | | | |
|---|---|---|---|
| 9,569,771 | B2 | 2/2017 | Lesavich et al. |
| 9,774,487 | B2 | 9/2017 | Christenson et al. |
| 2011/0238793 | A1* | 9/2011 | Bedare .................. H04L 45/586 709/220 |
| 2014/0281029 | A1* | 9/2014 | Danforth ............... H04L 67/327 709/243 |
| 2014/0325040 | A1 | 10/2014 | Moore |
| 2016/0006686 | A1 | 1/2016 | Arberg et al. |
| 2017/0031874 | A1* | 2/2017 | Boudville ............. H04L 9/3239 |
| 2017/0324738 | A1* | 11/2017 | Hari ........................ H04L 67/02 |
| 2018/0101842 | A1* | 4/2018 | Ventura ............... G06F 11/1458 |
| 2018/0300693 | A1* | 10/2018 | Gopinath ............. G06Q 20/065 |
| 2019/0163912 | A1* | 5/2019 | Kumar .................. H04L 9/3247 |
| 2019/0223089 | A1* | 7/2019 | Salgueiro ............. H04W 48/20 |
| 2019/0349190 | A1* | 11/2019 | Smith .................... H04L 41/12 |
| 2020/0021446 | A1* | 1/2020 | Roennow ............ H04L 63/0478 |

OTHER PUBLICATIONS

Narayanan, Arvind, ""Private blockchain" is just a confusing name for a shared database", (web page), available online at <https://freedom-to-tinker.com/2015/09/18/private-blockchain-is-just-a-confusing-name-for-a-shared-database/>, Sep. 18, 2015, 3 pages.

Hu et al., "Review of blockchain-based Dns alternatives", Chinese Journal of Network and Information Security, vol. 3, No. 3, Mar. 2017, pp. 00157-1-00157-7.

Gaetani et al., "Blockchain-Based Database to Ensure Data Integrity in Cloud Computing Environments", In Proceedings of the First Italian Conference on Cybersecurity (ITASEC17), 2017, pp. 146-155.

European Search Report and Search Opinion Received for EP Application No. 18183267.6, dated Jan. 7, 2019, 10 pages.

Ensuring High Availability of DHCP Using Windows Server 2012 DHCP Failover, Jun. 28, 2012. 3 Pgs., https://blogs.technet.microsoft.com/teamdhcp/2012/06/28/ensuring-hight-availability-of-dhcp-using-windows-server-2012-dhcp-failover/.

Suehring, S., Design and Implement Network Infrastructure Services, (Web Page), Nov. 15, 2012, 37 Pgs.

* cited by examiner

HIGHLY AVAILABLE DHCP SERVICE BY RUNNING DHCP SERVERS ON A BLOCKCHAIN NETWORK

CROSS-REFERENCE TO RELATED APPLICATIONS

The present application claims priority to Indian Patent Application No. 201841016089 filed on Apr. 27, 2018, which is incorporated herein by reference in its entirety.

DESCRIPTION OF THE RELATED ART

The dynamic host configuration protocol (DHCP) is a network management protocol used to dynamically assign IP addresses to client computing devices ("DHCP clients") as they connect to TCP/IP networks. The DHCP operates based on a client-server model. An operating system (OS) of a DHCP client may be configured to use DHCP such that the DHCP client may automatically (e.g., upon boot up) request IP addresses and networking parameters from DHCP servers. A system running DHCP server software (e.g., a gateway or router) is configured to respond to DHCP messages received from clients and offer IP addresses from a range of IP addresses, which are sometimes referred to as a "scope" in the case of IP addresses assigned to a single subnet.

A characteristic of the DHCP protocol is that it was originally designed as a one to many protocol. In other words, a single DHCP server was designed to serve multiple clients using a scope of IP addresses. One problem with this design is that it provides a single point of failure at the DHCP server. Recent configurations of DHCP server software have attempted to address this issue by allowing for the use of multiple DHCP servers to allocate IP addresses from a scope. These configurations are sometimes referred to a as "highly available DHCP services."

In one configuration of a highly available DHCP service, sometimes referred to a "split-scope DHCP" configuration, a first DHCP server assigns a first portion of IP addresses from an IP address scope to a subnet, and a second DHCP server assigns a second portion of IP addresses from the IP address scope to the subnet. For example, a first DHCP server may service 80% of IPv4 addresses (e.g., 192.168.100.2 through 192.168.100.203) and the second DHCP server may service 20% of IP addresses (e.g., 192.168.100.204 through 192.168.100.254).

In another configuration of a highly available DHCP service, sometimes referred to as a "DHCP failover" configuration, two DHCP servers may offer all IP addresses from a scope. Such DHCP failover configurations may operate in two modes: (i) a hot standby mode; and (ii) a load-sharing mode. In a hot standby mode, an active, primary DHCP server may respond to all client requests, while a passive, backup server may maintain a replicated version of the DHCP information, ready to take over if the primary DHCP server fails. In a load-sharing mode, both DHCP servers may respond to client requests and update a shared database with IP address lease information.

BRIEF SUMMARY OF THE DISCLOSURE

Implementations disclosed herein are directed to systems and methods for providing a highly available DHCP service using a plurality of DHCP servers running on a blockchain network.

In one embodiment, one or more servers may be configured to perform a method including the operations of: receiving, at a first server, a discover message transmitted by a client, the discover message including an IP address lease request; preparing, at the first server, an offer message transaction, the offer message transaction including an IP address to be offered by the first server to the client; and transmitting the offer message transaction from the first server to a blockchain network for validation. In this embodiment, the IP address may be selected from a pool of IP addresses shared by multiple servers including the first server, the multiple servers form the blockchain network whereby each of the multiple servers maintains a respective copy of a blockchain, the respective copy of the blockchain including a history of allocation of IP addresses from the pool by the servers to a plurality of clients. In various implementations, the multiple servers may be DHCP servers.

In implementations, the method may further include the operation of: the first server using a private key to digitally sign the offer message transaction prior to transmitting it to the blockchain network for validation.

In implementations, the method may further include the operations of: the first server receiving a block from the blockchain network, the received block including a validation of the offer message transaction transmitted to the blockchain network; and the first server updating its respective copy of the blockchain with the received block.

In implementations, the method may further include the operations of: after the first server updating its respective copy of the blockchain, the first server transmitting to the client an offer message offering a lease of the IP address; and the first server receiving a request message from the client requesting the offered IP address.

In implementations, the method may further include the operations of: after receiving the request message, the first server preparing an acknowledgement message transaction including an acknowledgement of the assignment of the offered IP address that is to be leased to the client device; and transmitting the acknowledgement message transaction from the first server to the blockchain network for validation.

In implementations, the method may further include the operations of: the first server receiving a block from the blockchain network, the received block including a validation of the acknowledgement message transaction transmitted to the blockchain network; and the first server updating its respective copy of the blockchain with the received block including the validation of the acknowledgement message transaction.

In implementations, the method may further include the operation of: after the first server updating its respective copy of the blockchain with the received block including the validation of the acknowledgement message transaction, the first server transmitting to the client an acknowledgement message acknowledging the lease of the IP address.

In implementations, the method may further include the operation of: validating, at a second of the multiple servers, the offer message transaction, where the second server validating the offer message transaction includes the second server verifying the offer message transaction against its respective copy of the blockchain to determine if the offered IP address is available for allocation.

In implementations, the IP address lease request includes a request to renew an IP address lease.

In implementations, the method may further include the operation of: the servers of the blockchain network coming to a consensus that validates the offer message transaction and updates the blockchain with a block including the validated transaction.

In one embodiment, a system includes: DHCP servers communicatively coupled over a network, each of the DHCP servers configured to allocate IP addresses to clients from a pool of IP addresses shared by the DHCP servers; and a blockchain stored by each of the DHCP servers, the blockchain including a chronological record of communications between the DHCP servers and clients relating to allocation of IP addresses to clients from the pool.

In this implementation, the blockchain stored by each of the DHCP servers may include a record of DHCP offer messages between the DHCP servers and clients and/or a record of DHCP acknowledgement messages between the DHCP servers and clients.

In implementations, each of the DHCP servers includes a memory storing instructions, that, when executed by one or more processors perform the operation of: using at least the stored blockchain to validate an IP address allocation transaction received from another DHCP server.

In one embodiment, one or more servers may be configured to perform a method including the operations of: receiving, at a first server, an encrypted IP address allocation transaction from a second server communicating with a client device; decrypting, at the first server, the received encrypted IP address allocation transaction using a public key associated with the second server; and validating, at the first server, the IP address allocation transaction using a blockchain stored on the first server, the blockchain including a chronological record of communications between multiple servers and clients relating to allocation of IP addresses to clients from an IP address pool shared by servers, where the servers form a blockchain network that adds blocks to the blockchain by a coming to a consensus, where the servers include the first server and the second server. Each of the servers may implemented as a DHCP server storing a respective copy of the blockchain. The IP address allocation transaction may include a DHCP offer transaction or DHCP acknowledgement transaction.

In implementations, the method may further include the operations of: the first server creating a block including the validated IP address allocated transaction; and the first server updating its copy of the blockchain using the created block. In implementations, the method may further include the operation of: the first server broadcasting the created block to the plurality of servers.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

The figures are not intended to be exhaustive or to limit various embodiments to the precise form disclosed. It should be understood that various embodiments can be practiced with modification and alteration.

DETAILED DESCRIPTION

Current DHCP failover configurations that offer highly available DHCP services using two DHCP servers have their limitations. For example, although the split-scope DHCP configurations described above provide a failover mechanism if one of the two DHCP servers goes down, the portion of IP addresses managed by the lost DHCP server will become unavailable until it comes online again. In some cases, this may represent 80% or more of the scope of available IP addresses.

As another example, the DHCP hot-standby configuration described above only uses a secondary DHCP server as a backup if a primary DHCP server fails. Although such a configuration guards against failovers, it may inefficiently utilize the computing resources of the secondary DHCP server. As a further example, the DHCP failover load-sharing configuration described above requires that the DHCP servers share a common database. Such a configuration may add additional expenses and require additional resources to properly manage. Additionally, such a configuration may not be particularly suitable for a geographically distributed network of devices.

Embodiments of the technology described herein are directed to addressing these and other technical limitations with present implementations of highly available DHCP services. In particular, implementations described herein are directed to systems and methods for providing a highly available DHCP service using a plurality of DHCP servers running on a blockchain network. In accordance with implementations, a highly available DHCP service may be provided by running a blockchain network of DHCP servers that: i) share a common pool of IP addresses that are assigned to client devices; and ii) maintain a copy of a blockchain containing all communications between servers and clients relating to allocation of IP addresses to clients from the common IP address pool.

By virtue of running the DHCP servers on a blockchain network, implementations described herein may provide several benefits. First, by virtue of using a blockchain network that validates all communications associated with IP address allocation, each and every DHCP server in the network may be able to allocate all IP addresses from a common pool without address conflict issues. Second, by virtue of using a blockchain to record all IP address allocation transactions, this may minimize the computational resources required by each DHCP server to manage IP address assignments (e.g., as contrasted with using a conventional database). Third, by virtue of each DHCP server recording all IP allocation transactions on a copy of a blockchain (e.g., distributed ledger), implementations described herein may provide security advantages such as guarding against ARP cache poisoning, denial-of-service (DOS) attacks, and other IP spoofing attacks. These and other benefits that may be realized by embodiments described herein can be further appreciated from the description.

Figure 1:
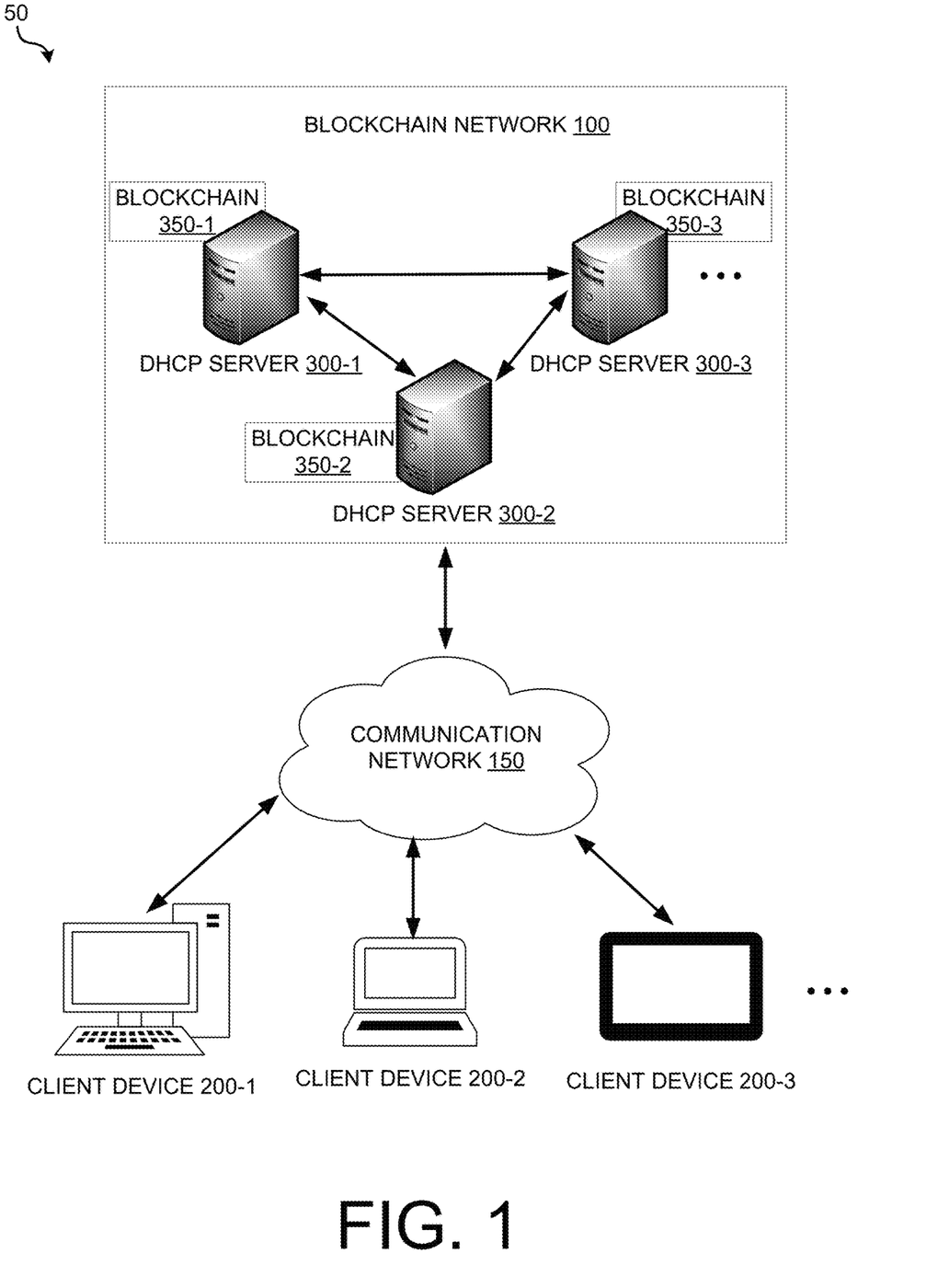
FIG. 1 illustrates an example highly available DHCP service environment in which the disclosed technology may be implemented.

FIG. 1 illustrates an example highly available DHCP service environment 50 in which the disclosed technology may be implemented. In environment 50, a blockchain network 100 of DHCP servers 300-1 to 300-3 (individually referred to as "DHCP server 300") allocate IP addresses from a shared IP address pool to client devices 200-1 to 200-3 (individually referred to as "client device 200") over a communication network 150. Although three DHCP servers 300-1 to 300-3 and three client devices 200-1 to 200-3 are illustrated in example environment 50, it should be appreciated that blockchain network 100 may include any number of DHCP servers (e.g., 2, 4, 5, etc.) providing DHCP services to any number of client devices (e.g., 1, 10, 100, etc.)

Each DHCP server 300 may be implemented as a router, gateway, or other device configured to run DHCP server software. In some implementations, a DHCP server 300 may be implemented as a virtual machine running on a host. Each client device 200 may be a desktop computer, a laptop, a mobile device such as a tablet or smartphone, or any other device capable of being allocated an IP address by a DHCP server 300. Although physical client machines are illustrated in example environment 50, it should be appreciated that implementations described herein may also be implemented to allocate IP addresses to client devices running as virtual machines on a host.

In implementations where all client devices are part of the same subnet, the shared pool of IP addresses allocated by DHCP servers 300-1 to 300-3 may include a single scope or range of IP addresses that are leased to DHCP clients on the subnet. For example, for a three DHCP server implementation, a shared pool of IP addresses that may be assigned to DHCP clients include the range 192.168.1.4 through 192.168.1.254, and IP addresses 192.168.1.1, 192.168.1.2, and 192.168.1.3 may be statically assigned to each DHCP server. In addition to a range of IP addresses, each scope may be associated with other IP networking configuration parameters that may be assigned to DHCP clients such as IP addresses of DNS servers, WINS servers, IP address lease duration (e.g., length of time a DHCP client may use an IP address before it must be renewal), etc.

In implementations where client devices 200-1 to 200-3 are on multiple subnets, the shared pool of IP addresses allocated by DHCP servers 300-1 to 300-3 may include multiple scopes or ranges of IP addresses, where each scope of IP addresses corresponds to a respective subnet and is used to assign IP addresses to a DHCP client on its subnet. In such implementations, environment 50 may additionally include relay agents such as routers or switches (not shown) to forward requests and replies between a client device 200 and DHCP server 300 that are not on the same subnet.

Communications network 150 may comprise any communications network suitable for exchanging DHCP communications between DHCP client devices 200-1 to 200-3 and DHCP servers 300-1 to 300-3. Some non-limiting examples of communication methods over which DHCP client devices and servers may connect to a communication network 150 include: wired communications methods, such as cable, fiber-optic, or DSL; or wireless communications methods, such Wi-Fi, cellular communications, or satellite communications. In some instances, a plurality of these communication methods may be utilized. In some implementations, communication network may be implemented as an intranet network (e.g., enterprise, campus, or personal intranet).

In example environment 50, each DHCP server 300 of blockchain network 100 stores a respective copy of a blockchain 350 that contains a chronologically ordered, back-linked list of blocks, including IP address allocation transactions made by DHCP servers in the blockchain network 100. Each copy of blockchain 350 may contain all IP lease offer information and/or IP lease acknowledge information sent by every DHCP server 300 to every client 200.

Figure 2:
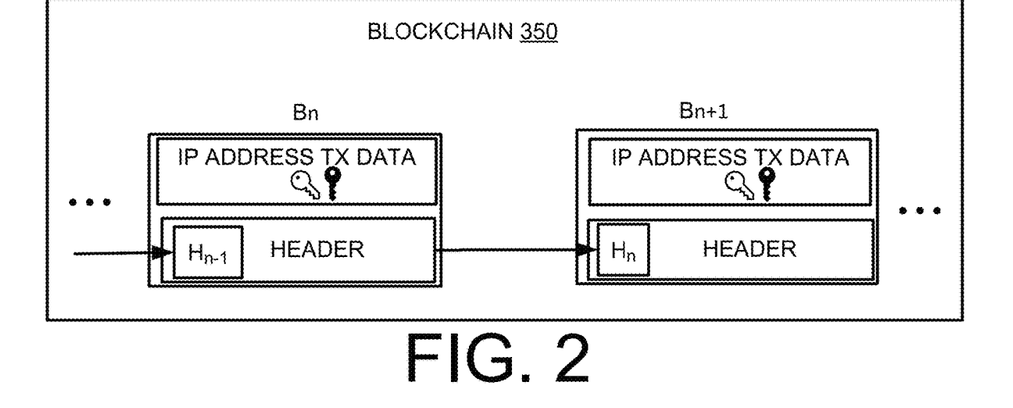
FIG. 2 illustrates one exemplary data structure for a blockchain 350 that may be stored on a DHCP server, in accordance with the disclosure.

FIG. 2 illustrates one exemplary data structure for a blockchain 350 that may be stored on a DHCP server 300. As illustrated, the data structure of blockchain 350 is a chronologically ordered, back-linked list of blocks, including IP address allocation transactions made by DHCP servers. In this implementation, each block of the blockchain comprises a header and transaction information related to one or multiple transactions conducted with respect to IP address allocation from a pool of IP addresses shared by DHCP servers on the blockchain network. The header of each block (except for e.g., the genesis block) may include a hash of the header of the previous and current block. In implementations, the header may comprise additional block metadata such as a timestamp (e.g., the approximate creation time of the block), hash trees (e.g., for transaction information, state information, etc.) and other information.

In some implementations, blockchain 350 may implemented as a "permissioned" or "private" blockchain in which only permissioned entities (e.g., DHCP servers 300) may validate IP address allocation transactions. In these implementations, upon creation/configuration of the blockchain network 100, each DHCP server 300 may be assigned a unique private key to make changes and/or validate IP address allocation transactions on the blockchain. Additionally, a corresponding public key associated with DHCP server may be distributed to the other DHCP servers and/or stored on the block chain 350. In implementations, the private and public key pairs assigned to each DHCP server may be implemented in accordance with the digital signature algorithm (DSA) or the elliptic curve digital signature algorithm (ECDSA).

Figure 3:
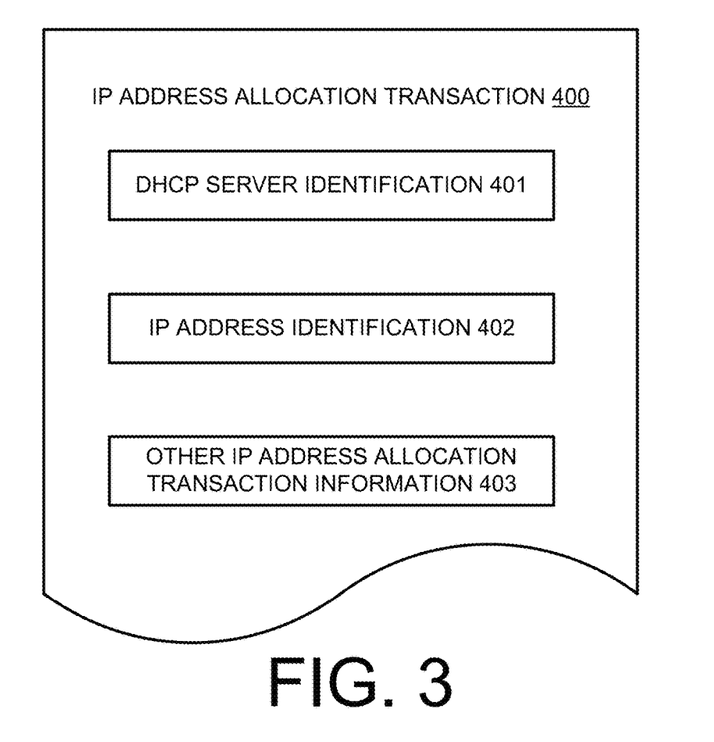
FIG. 3 illustrates an example IP address allocation transaction that may be stored in a block of the blockchain, in accordance with the disclosure.

FIG. 3 illustrates an example IP address allocation transaction 400 that may be stored in a block of the blockchain. A transaction 400 may include one or more of a DHCP server identification 401 (e.g., IP address associated with DHCP server broadcasting the transaction 400 to the network), an allocated IP address identification 402 (e.g., IP address that is to be leased), and other IP address allocation transaction information 403 (e.g., IP lease duration, timestamp of transaction, client identification such as MAC address, public key information, etc.).

Figure 4:
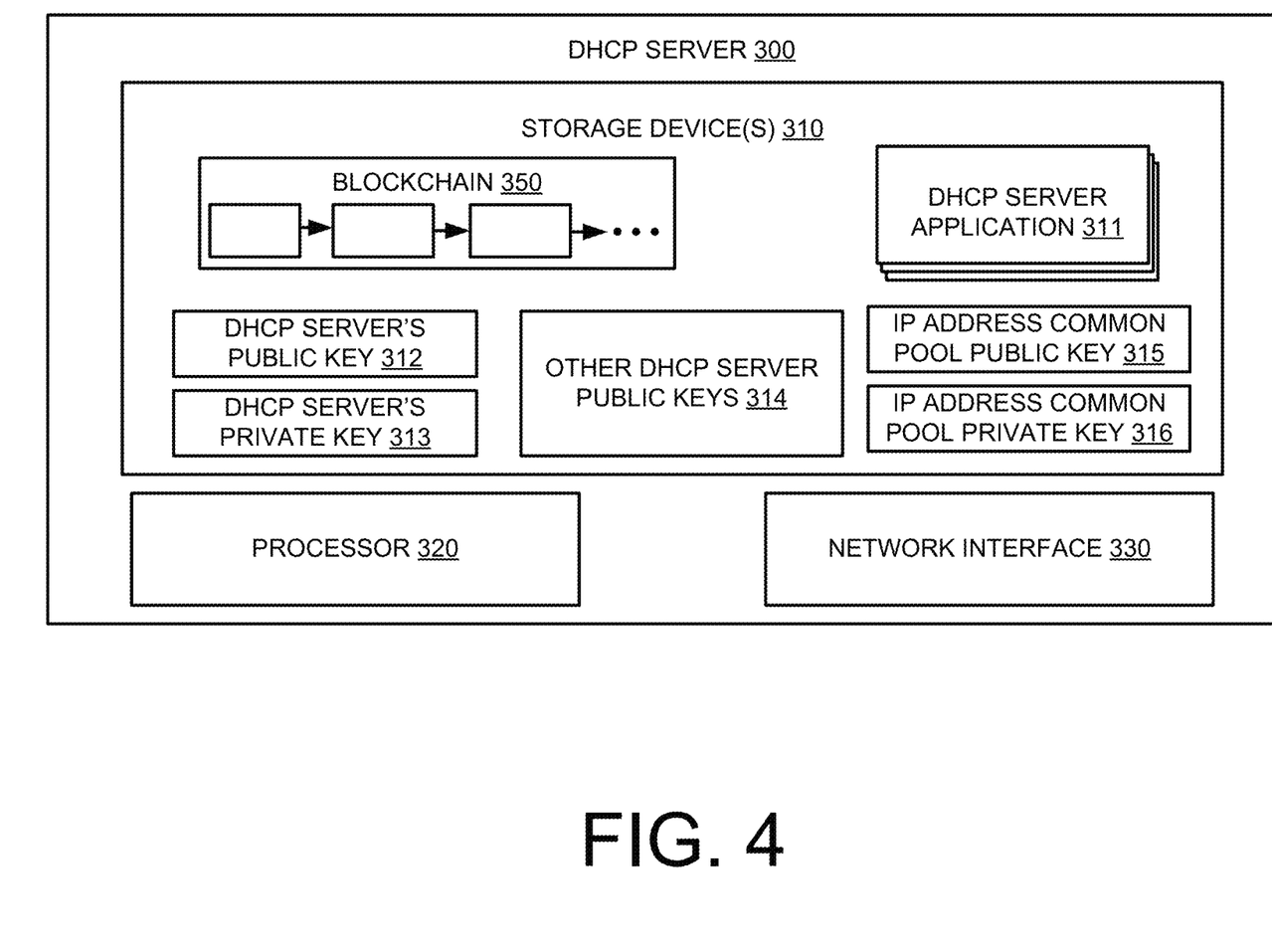
FIG. 4 is a schematic block diagram illustrating one particular example of a DHCP server, in accordance with the disclosure.

FIG. 4 is a schematic block diagram illustrating one particular example of a DHCP server 300, in accordance with the disclosure. As illustrated, a DHCP server 300 may include one or more storage devices 310, a processor 320 (e.g., a processor to execute machine readable instructions to run a DHCP server application 311 on a blockchain network), and a network interface 330 (e.g., a network interface card to communicate with other DHCP servers or client devices).

As illustrated, DHCP server 300 may store a respective copy of a blockchain 350, its own public key 312, its own private key 313, and a list of public keys 314 utilized by other DHCP servers. Private key 313 may be uniquely known by DHCP server 300, and may be used to digitally sign IP address allocation transactions that are submitted to the blockchain network for authentication. The list of other DHCP server public keys 314 may be used to decrypt IP address allocation transactions submitted by other DHCP servers to the blockchain network for verification. In some implementations, the list 314 may be maintained as a table associating each DHCP server's IP address (e.g., static IP address) with a respective public key.

DHCP server 300 may also store a public key 315 and corresponding private key 316 associated with a common pool of IP addresses shared by the DHCP servers 300. Each IP address in the common pool may be available for leasing to a client device by any of the DHCP servers in the blockchain network. During initialization of a blockchain 350 (e.g., when a DHCP network is first initialized), public key 315 may be transferred ownership of a common pool of IP addresses including a single scope or multiple scopes of IP addresses that may be leased to clients as they join the DHCP network. In implementations, this initial transfer of ownership may be reflected in a genesis block of a blockchain 350.

During IP address leasing, a DHCP server 300 may use the common pool private key 316 to transfer ownership of an IP address from the common pool public key 315 to its own public key 312. Thereafter, the IP address may no longer be part of the common pool, and no other DHCP server may lease that IP address to a client device 200 (e.g., only the DHCP server having private key 313 may lease that IP address). Conversely, after taking ownership of an IP address from the common pool, the DHCP server 300 may subsequently release ownership of the IP address back to the common pool (e.g., if a client device fails to renew the IP address lease) by a blockchain transaction that it signs with its private key 313 to transfer ownership from its own public key 312 to common pool public key 315.

DHCP server 300 may also store a DHCP server application 311 that may be used to perform DHCP server functions such as leasing IP addresses (e.g., by sending offer and/or acknowledgement messages). In addition, the DHCP server application 311 may be used to communicate with a blockchain network 100 to make IP resource allocation transactions and to update a blockchain 350.

Figure 5:
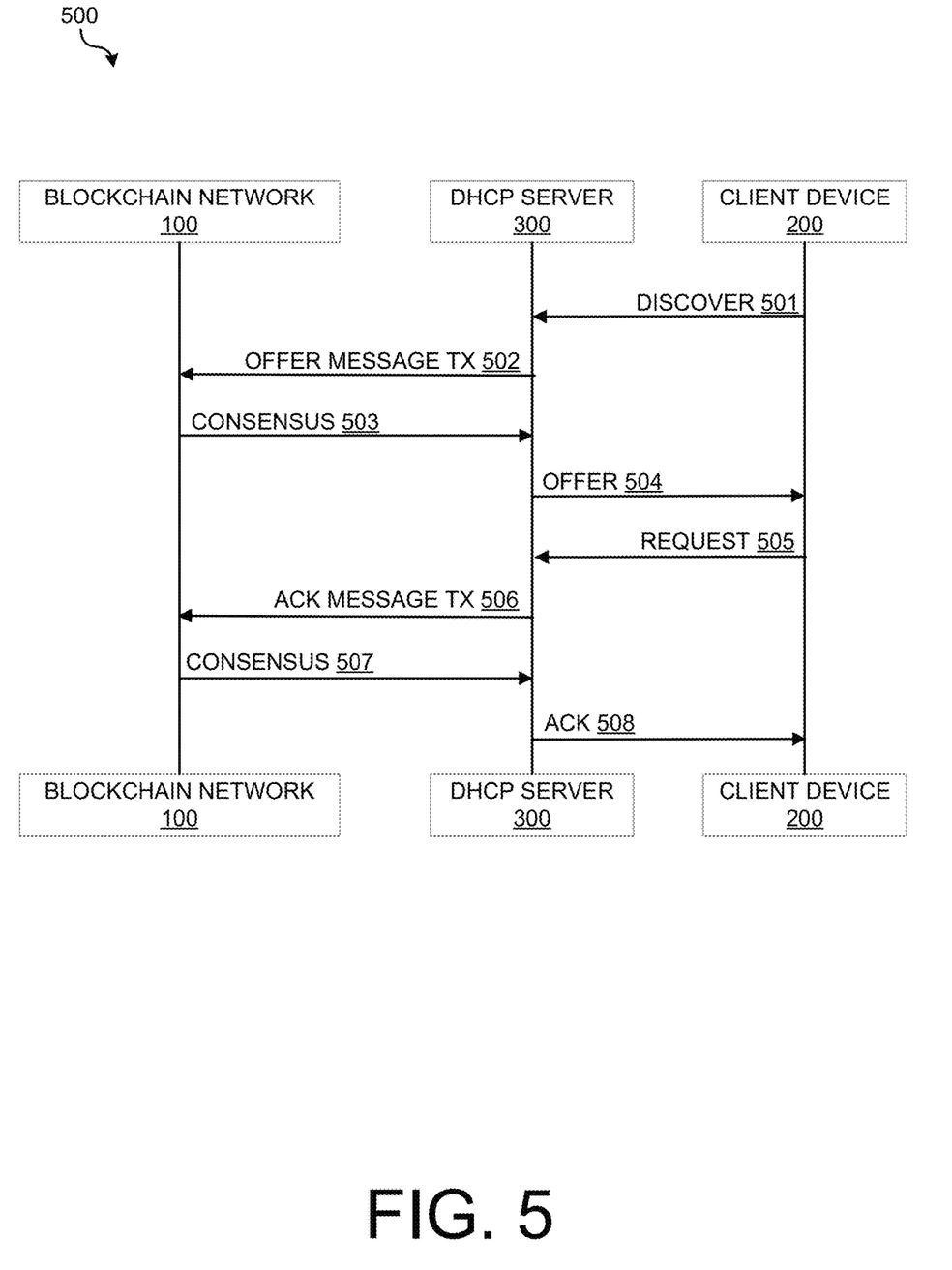
FIG. 5 is a sequence diagram illustrating an example process that may be implemented in a highly available DHCP service environment including a blockchain network to assign an IP address to a client device, in accordance with implementations.

FIG. 5 is a sequence diagram illustrating an example process 500 that may be implemented in a highly available DHCP service environment 50 including a blockchain network 100 to assign an IP address to a client device 200, in accordance with implementations. As illustrated, a client 200 may transmit a discover message 501 including an IP address lease request. For example, the client device 200 may broadcast a DHCPDISCOVER message using a suitable broadcast address on the network (e.g., a specific subnet broadcast address or 255.255.255.255). In some implementations, if the client device 200 has been previously assigned an IP address, the discover message 501 may include a request to renew an existing IP address lease and an identification of the IP address already assigned to the client. In such implementations, the discover message 501 may be unicast to a DHCP server 300 that previously assigned the IP address to the client 200.

A DHCP server 300 that receives message 501 may then prepare an offer message transaction 502 that is transmitted to blockchain network 100. The transmitted offer message transaction 502 may include an IP address lease offer including an IP address to be offered to the client device 200 by DHCP server 300 from a shared pool of available IP addresses. The transmitted offer message transaction 502 may also include other information typically associated with a DHCP offer message. The offer message transaction 502 may be transmitted to blockchain network 100 to verify that the offered IP address is not currently reserved by another DHCP server 300 (e.g., currently leased to another client device 200) and to update the blockchain to include the verified message (e.g., collectively come to a consensus).

In implementations, the DHCP server 300 may generate the offer message transaction 502 by using an IP address common pool private key 315 to assign ownership of an IP address (e.g., the IP address that is to be leased to client device 200) from an IP address common pool public key 315 to the DHCP server's own public key 312. This offer message transaction 502 may be digitally signed using a private key 313 of the DHCP server 300.

In implementations, the offer message transaction 502 may be broadcast to all or a subset of DHCP servers on blockchain network 100 by DHCP server 300. In implementations where the offer message transaction 502 is broadcast to a subset of servers, the message may be propagated by the receiving DHCP servers to other DHCP servers on the blockchain network that did not receive the broadcast.

Thereafter, the DHCP servers of blockchain network 100 may come to a consensus 503 that validates the offer message transaction 502 and updates the blockchain with a block including the validated transaction. In some implementations, this consensus process may comprise each of the DHCP servers validating the offer message transaction 502 against their respective copy of a blockchain 350 and running a proof of work algorithm to add a new block to the blockchain, the new block including the validated transaction. In other implementations, this consensus process may comprise one of the DHCP servers validating the offer message 502 against its respective copy of a blockchain 350 and adding a new block to the blockchain (e.g., as part of a "proof of stake" consensus algorithm that randomly selects the DHCP server to validate). Other blockchain consensus algorithms may be used to validate the transaction and add it to a new block. The added block may be propagated to all DHCP servers to update their respective copy of the blockchain 350.

After a consensus 503 has been reached by the blockchain network 100, the DHCP server 300 (and other DHCP servers) may have received a new block containing the validated transaction and updated their respective copy of the blockchain. Thereafter, the DHCP server 300 may transmit an offer message 504 (e.g., DHCPOFFER message) to client 200 making an offer to lease the IP address. In implementations, offer message 504 to client device 200 may comprise the same information (e.g., offered IP address, etc.) as the offer message transaction 502 that was validated and recorded on the blockchain.

Thereafter, client device 200 may transmit an acceptance or request message 505 (e.g., a DHCPREQUEST message) requesting the offered IP address. The request message 505 may identify the DHCP server 300 from which the client has accepted the IP lease offer.

The DHCP server 300 server receiving request message 505 may then prepare an acknowledgment message transaction 506 that may be transmitted to the blockchain network 100 for verification (e.g., to verify that the acknowledged IP address is not currently reserved by another DHCP server 300) and to update the blockchain 350 to include the verified message. The transmitted acknowledgement message transaction 506 may include an identification of the leased IP address, a duration of the IP address lease, other network configuration parameters to be assigned to the client device 200, and other information typically associated with a DHCP acknowledgement message.

In implementations, the transmitted acknowledgement message transaction 506 may be digitally signed using a private key 313 of the DHCP server 300. In implementations, the acknowledgement message transaction 506 may be broadcast to all or a subset of DHCP servers on blockchain network 100 by DHCP server 300. In implementations where the acknowledgement message transaction 506 is broadcast to a subset of servers, the message may be propagated by the receiving DHCP servers to other DHCP servers on the blockchain network that did not receive the broadcast.

Thereafter, the DHCP servers of blockchain network 100 may come to a consensus 503 that validates the acknowledgement message transaction 506 and updates the blockchain with a block including the validated transaction. In some implementations, this consensus process may comprise each of the DHCP servers validating the acknowledgement message transaction 506 against their respective copy of a blockchain 350 and running a proof of work algorithm to add a new block to the blockchain, the new block including the validated transaction. In other implementations, this consensus process may comprise one of the DHCP servers validating the acknowledgement message transaction 506 against its respective copy of a blockchain 350 and adding a new block to the blockchain (e.g., as part of a "proof of stake" consensus algorithm that randomly selects the DHCP server to validate). Other blockchain consensus algorithms may be used to validate the transaction and add it to a new block. The added block may be propagated to all DHCP servers to update their respective copy of the blockchain 350.

After a consensus 507 has been reached by the blockchain network 100, the DHCP server 300 (and other DHCP servers) may have received a new block containing the validated transaction and updated their respective copy of the blockchain. Thereafter, the DHCP server 300 may transmit an acknowledgement message 508 (e.g., DHCPACK) acknowledging the lease of the IP address to client 200. In implementations, acknowledgement message 508 to client device 200 may comprise the same information (e.g., identification of the leased IP address, a duration of the IP address lease, other network configuration parameters assigned to the client device 200) as the acknowledgement message transaction 506 that was validated and recorded on the blockchain.

Figure 6:
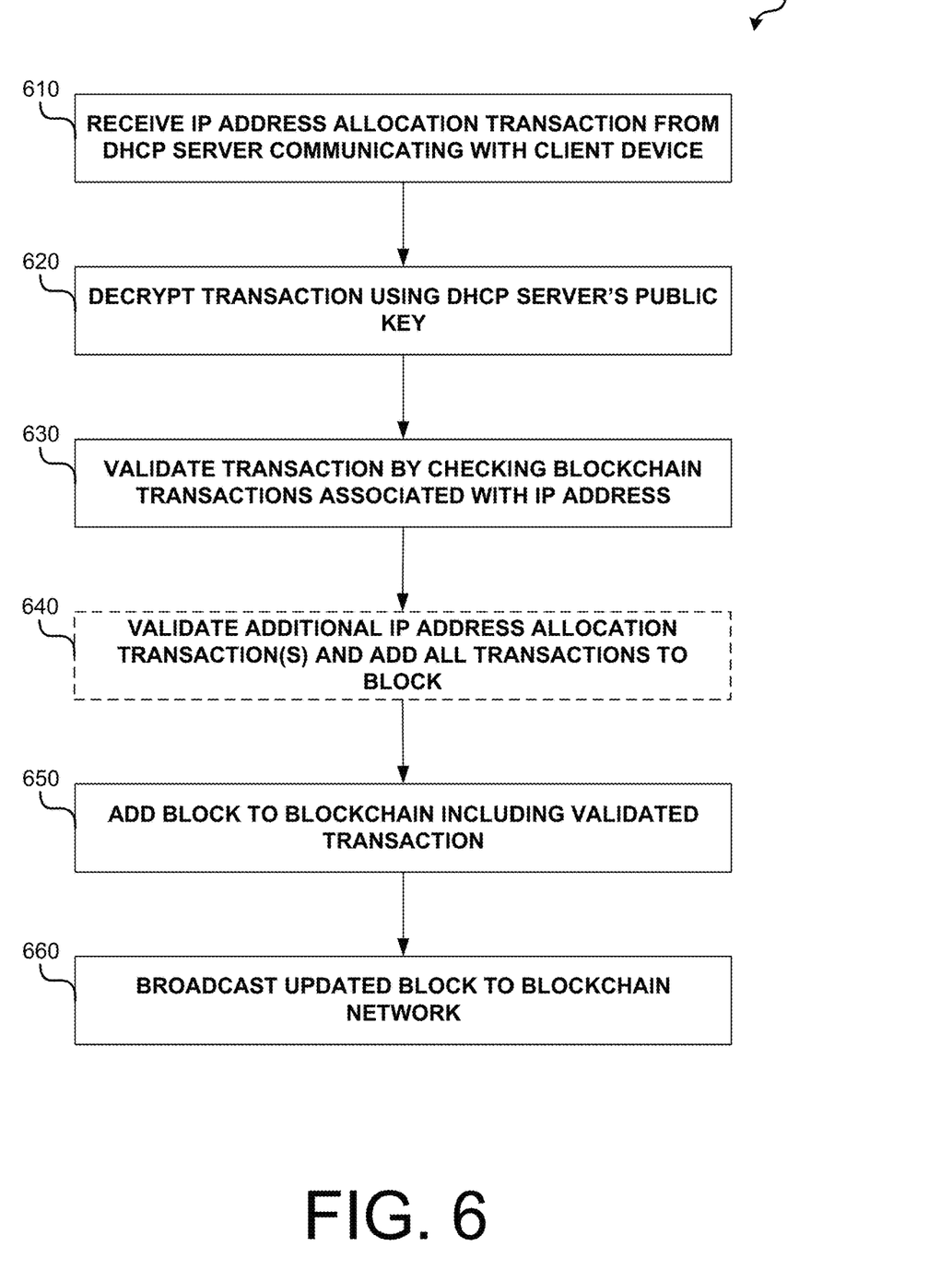
FIG. 6 is an operational flow diagram illustrating an example method that may be implemented by a DHCP server on a blockchain network to verify an IP address allocation transaction submitted by another DHCP server and update the blockchain, in accordance with implementations.

FIG. 6 is an operational flow diagram illustrating an example method 600 that may be implemented by a DHCP server (e.g., DHCP server 300) on a blockchain network (e.g. network 100) to verify an IP address allocation transaction submitted by another DHCP server (e.g., DHCP server 300) and update the blockchain, in accordance with implementations. In some implementations, the blockchain may be updated using a consensus based on a proof of work algorithm. In such implementations, for example, a secure hash algorithm (SHA) or other suitable proof-of-work algorithm may need to be produced to create a new block. In some instances, all DHCP servers, including the transacting DHCP server, may solve the proof-of-work algorithm.

In other implementations, prior to implementing method 600, the DHCP server may be selected by the blockchain network 100 to validate the transaction and update the blockchain as part of a proof of stake consensus algorithm. For example, for an IP address allocation transaction that requires validation, a DHCP server may be randomly selected from the available DHCP servers (not including the DHCP server that generated the IP address allocation transaction) to perform validation. In particular proof of stake implementations, a DHCP server may not be selected to validate two consecutive IP address allocation transactions.

In other implementations, other blockchain consensus algorithms may be used to validate transactions.

With specific reference now to the operations of method 600, at operation 610, a first DHCP server of a blockchain network may receive an IP address allocation transaction (e.g., a transaction 400) from a second DHCP server communicating with a client device. For example, the first DHCP server may receive an offer or acknowledgement message that was broadcast or otherwise propagated by the second DHCP server to a blockchain network for verification. In various implementations, the received transaction may be a digitally signed message that was encrypted with the second DHCP server's private key. For example, the digitally signed message may be a string of text generated by applying the second DHCP server's private key to an offer or acknowledgement transaction.

At operation 620, the first DHCP server may decrypt the received IP address allocation transaction (e.g., digitally signed message) to verify that the second DHCP server is the source of the request. For example, the first DHCP server may apply the second DHCP server's public key (e.g., known from DHCP server public keys 314) to the message to decrypt it.

At operation 630, the first DHCP server may validate the IP address allocation transaction against its copy of the blockchain by reviewing prior IP address allocation transactions associated with an IP address that is a subject of the current transaction. In this manner, the first DHCP server may determine if the IP address that is the subject of the IP address allocation transaction is available for allocation.

At optional operation 640, the first DHCP server may validate additional IP address allocation transactions. For example, additional offer message or acknowledgement message transactions broadcast by other DHCP servers may be validated by the first DHCP server (and decrypted) at around the time it validates the IP address allocation transaction received from the second DHCP server. Alternatively, operation 640 may be skipped if no other IP address allocation transactions require validation (e.g., depending on times when different transactions are received). Following validation, at operation 650, the first DHCP server may add a new block to its respective copy of the blockchain, the added block including all of the validated IP address allocation transactions.

In some implementations, the IP address allocation transactions may be validated and the block may be added by solving a proof-of-work algorithm. At operation 660, the first DHCP server may broadcast the added block to the blockchain network for other DHCP servers to update their respective copy of the blockchain.

Figure 7:
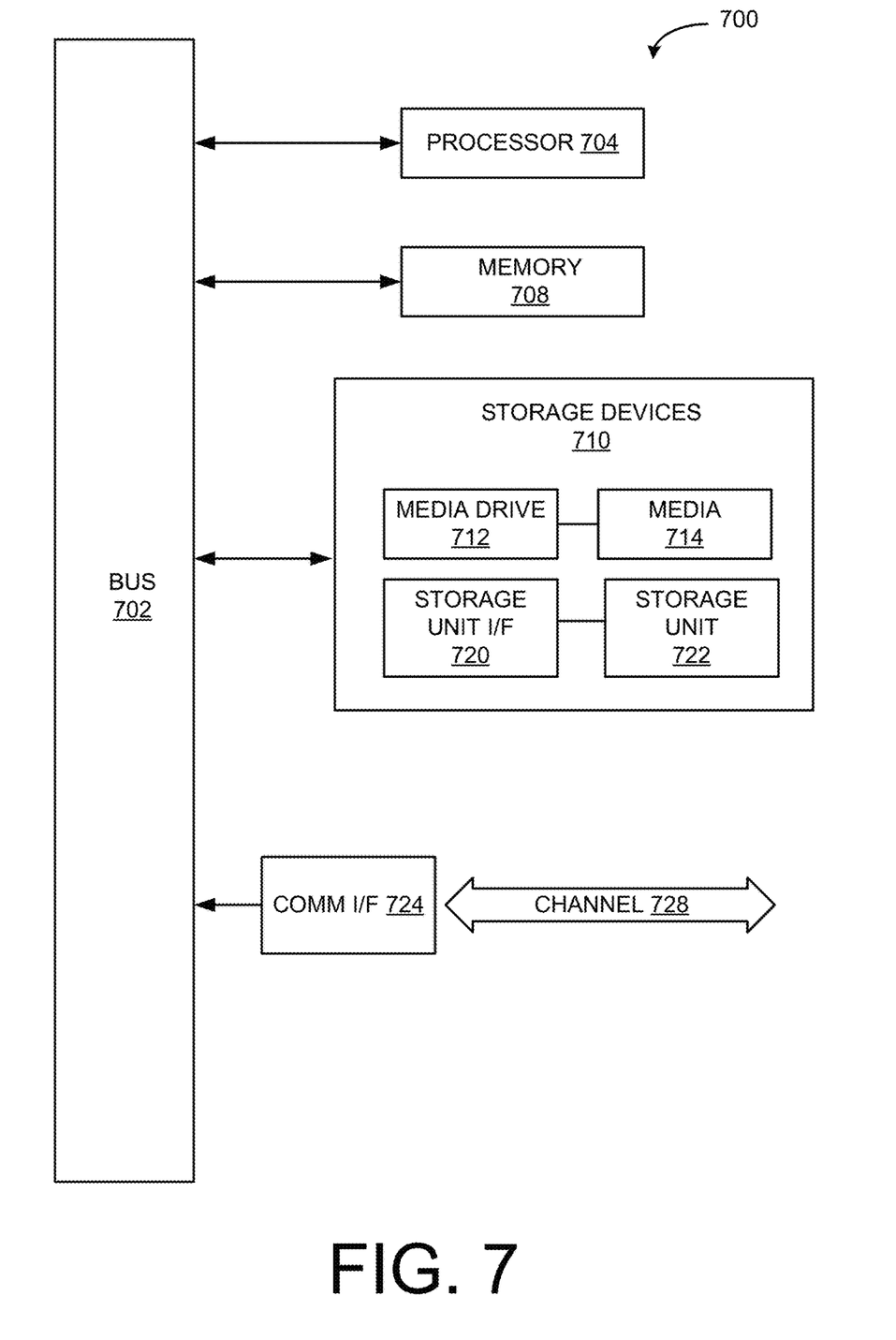
FIG. 7 is an example of a computing module that can be used in conjunction with various embodiments of the present disclosure.

FIG. 7 illustrates an example computing component 700 that may be used to implement various features of the methods disclosed herein. Computing component 700 may represent, for example, computing or processing capabilities found within desktops and laptops; hand-held computing devices (tablets, smartphones, etc.); mainframes, supercomputers, workstations or servers; or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, routers, gateways, modems, WAPs, terminals and other electronic devices that might include some form of processing capability.

Computing component 700 might include, for example, one or more processors, controllers, control components, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing component 700 or to communicate externally.

Computing component 700 might also include one or more memory components, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, an optical disk drive, a CD, DVD, or BLU-RAY drive (R or RW), or other removable or fixed media drive might be provided. Accordingly, storage media 714 might include, for example, a hard disk, a solid state drive, cartridge, optical disk, a CD, a DVD, a BLU-RAY, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot, a PCMCIA slot and card, and other fixed or removable storage units 722 and interfaces 720 that allow software and data to be transferred from the storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 708, storage unit 722, and media 714. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A non-transitory computer readable medium having executable instructions stored thereon, that, when executed by one or more processors perform the operations of:
   receiving, at a first server, a discover message transmitted by a client, the discover message comprising an IP address lease request;
   preparing, at the first server, an offer message transaction, the offer message transaction comprising an IP address to be offered by the first server to the client, wherein the IP address is selected from a pool of IP addresses shared by a plurality of servers including the first server, wherein the plurality of servers form a blockchain network whereby each of the plurality of servers maintains a respective copy of a blockchain, the respective copy of the blockchain comprising a history of allocation of IP addresses from the pool by the plurality of servers to a plurality of clients;
   transmitting the offer message transaction from the first server to the blockchain network for validation;
   receiving, at the first server, a first block from the blockchain network, the first block comprising a validation of the offer message transaction that was transmitted to the blockchain network;
   updating, at the first server, its respective copy of the blockchain with the first block;
   after updating its respective copy of the blockchain with the first block, transmitting, at the first server, to the client an offer message offering a lease of the IP address;
   receiving, at the first server, a request message from the client requesting the offered IP address;
   after receiving the request message, preparing, at the first server, an acknowledgement message transaction comprising an acknowledgement of the assignment of the offered IP address that is to be leased to the client; and
   transmitting the acknowledgement message transaction from the first server to the blockchain network for validation.

2. The non-transitory computer readable medium of claim 1, wherein the executable instructions, when executed by the one or more processors, further perform the operation of: digitally signing, at the first server, the offer message transaction with a private key prior to transmitting the offer message transaction to the blockchain network for validation.

3. The non-transitory computer readable medium of claim 1, wherein the executable instructions, when executed by the one or more processors, further perform the operation of:
   receiving, at the first server, a second block from the blockchain network, the second block comprising a validation of the acknowledgement message transaction transmitted to the blockchain network; and
   updating, at the first server, its respective copy of the blockchain with the second block.

4. The non-transitory computer readable medium of claim 3, wherein the executable instructions, when executed by the one or more processors, further perform the operation of: after updating its respective copy of the blockchain with the second block, transmitting to the client an acknowledgement message acknowledging the lease of the IP address.

5. The non-transitory computer readable medium of claim 1, wherein a second server of the plurality of servers validates the offer message transaction by verifying the offer message transaction against its respective copy of the blockchain to determine if the offered IP address is available for allocation.

6. The non-transitory computer readable medium of claim 1, wherein the plurality of servers are a plurality of DHCP servers that come to a consensus that validates the offer message transaction and updates the blockchain with a block including the validated transaction.

7. A system, comprising:
   a plurality of DHCP servers communicatively coupled over a network, wherein each of the plurality of DHCP servers comprises a non-transitory computer readable medium having executable instructions stored thereon, that, when executed by one or more processors perform the operation of:
      allocateing IP addresses to clients from a pool of IP addresses shared by the plurality of DHCP servers; and
   a blockchain stored by each of the plurality DHCP servers, the blockchain comprising a chronological record of communications between the plurality of DHCP servers and clients relating to allocation of IP addresses to clients from the pool,
   wherein the plurality of the DHCP servers comes to a consensus that validates an offer message transaction and updates the blockchain with a block including the validated offer message transaction, and wherein the plurality of DHCP servers comes to a consensus that validates an acknowledgement message transaction and updates the blockchain with a block including the validated acknowledgement message transaction.

8. The system of claim 7, wherein the blockchain stored by each of the plurality of DHCP servers comprises a record of DHCP offer messages between the plurality of DHCP servers and clients.

9. The system of claim 8 wherein the blockchain stored by each of the plurality of DHCP servers comprises a record of DHCP acknowledgement messages between the plurality of DHCP servers and clients.

10. The system of claim 7, wherein each of the plurality of DHCP servers comprises: a non-transitory computer readable medium having executable instructions stored thereon, that, when executed by one or more processors perform the operation of: using at least the stored blockchain to validate an IP address allocation transaction received from another DHCP server.

11. A non-transitory computer readable medium having executable instructions stored thereon, that, when executed by one or more processors perform the operations of:
receiving, at a first server, an encrypted IP address allocation transaction from a second server communicating with a client;
decrypting, at the first server, the received encrypted IP address allocation transaction using a public key associated with the second server;
validating, at the first server, the IP address allocation transaction using a blockchain stored on the first server, the blockchain comprising a chronological record of communications between a plurality of servers and clients relating to allocation of IP addresses to clients from an IP address pool shared by the plurality of servers, wherein the plurality of servers form a blockchain network that adds blocks to the blockchain by coming to a consensus that validates an offer message transaction and by coming to a consensus that validates an acknowledgement message transaction, wherein the plurality of servers comprise the first server and the second server.

12. The non-transitory computer readable medium of claim 11, wherein the executable instructions, when executed by the one or more processors, further perform the operations of: creating, at the first server, a block including the validated IP address allocated transaction; and updating, at the first server, its copy of the blockchain using the created block.

13. The non-transitory computer readable medium of claim 12, wherein the executable instructions, when executed by the one or more processors, further perform the operations of: broadcasting, at the first server, the created block to the plurality of servers.

14. The non-transitory computer readable medium of claim 13, wherein each of the plurality of servers stores a respective copy of the blockchain.

15. The non-transitory computer readable medium of claim 11, wherein the plurality of servers are a plurality of DHCP servers.

16. The non-transitory computer readable medium of claim 15, wherein the IP address allocation transaction comprises a DHCP offer message or DHCP acknowledgement message.

17. A method, comprising:
receiving, at a first server, a discover message transmitted by a client, the discover message comprising an IP address lease request;
preparing, at the first server, an offer message transaction, the offer message transaction comprising an IP address to be offered by the first server to the client, wherein the IP address is selected from a pool of IP addresses shared by a plurality of servers including the first server, wherein the plurality of servers form a blockchain network whereby each of the plurality of servers maintains a respective copy of a blockchain, the respective copy of the blockchain comprising a history of allocation of IP addresses from the pool by the plurality of servers to a plurality of clients;
transmitting the offer message transaction from the first server to the blockchain network for validation;
receiving, at the first server, a first block from the blockchain network, the first block comprising a validation of the offer message transaction that was transmitted to the blockchain network;
updating, at the first server, its respective copy of the blockchain with the first block;
after updating its respective copy of the blockchain with the first block, transmitting, at the first server, to the client an offer message offering a lease of the IP address;
receiving, at the first server, a request message from the client requesting the offered IP address;
after receiving the request message, preparing, at the first server, an acknowledgement message transaction comprising an acknowledgement of the assignment of the offered IP address that is to be leased to the client; and
transmitting the acknowledgement message transaction from the first server to the blockchain network for validation.

* * * * *